United States Patent [19]

Le Pierres et al.

[11] Patent Number: 4,474,273

[45] Date of Patent: Oct. 2, 1984

[54] MOVEMENT LIMITING DEVICE FOR A PLANT UNDER PRESSURE

[75] Inventors: Gildas Le Pierres, La Ferte Alais; Bertrand Vatin, Orsay, both of France

[73] Assignee: 501 International Vibration Engineer, Boutigny-Sur-Essonne, France

[21] Appl. No.: 389,108

[22] Filed: Jun. 16, 1982

[30] Foreign Application Priority Data

Jun. 26, 1981 [FR] France .................................. 81 12629

[51] Int. Cl.³ .............................................. F16F 7/06
[52] U.S. Cl. ................................... 188/381; 188/129; 188/134; 188/378
[58] Field of Search ............... 188/271, 272, 279, 129, 188/185, 184, 134–136, 378, 381, 70 R

[56] References Cited

U.S. PATENT DOCUMENTS

| 2,856,179 | 10/1958 | Hogan | 188/129 |
| 3,809,186 | 5/1974 | Suozzo | 188/129 |
| 4,094,387 | 7/1978 | Pelat et al. | 188/381 |
| 4,253,551 | 3/1981 | Calabrese | 188/378 |

Primary Examiner—Bruce H. Stoner, Jr.
Assistant Examiner—Alvin E. Oberley
Attorney, Agent, or Firm—Larson and Taylor

[57] ABSTRACT

The device is adapted to limit the movement, and in particular the whipping, of large-diameter pipes under very high pressure in the event of sudden fracture. It comprises two relatively slidable elements and a rotary member which is rotated by the relative sliding and is associated with braking members. Powerful dampeners are interposed between the elements and are brought into action at the end of the travel of the elements and rub against the rotary member. Application in nuclear stations.

8 Claims, 4 Drawing Figures

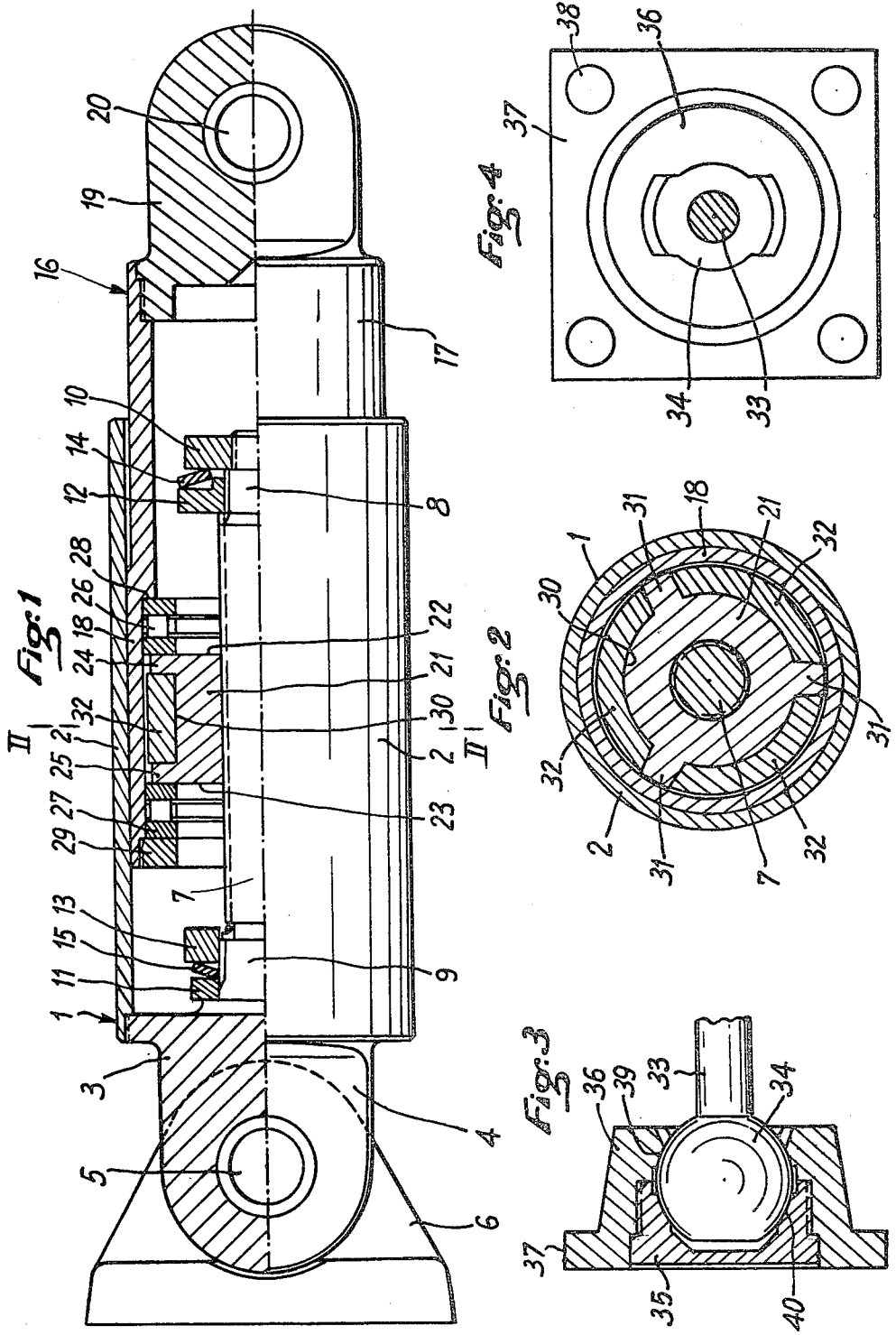

MOVEMENT LIMITING DEVICE FOR A PLANT UNDER PRESSURE

DESCRIPTION

The present invention relates to a movement limiting device for connecting structures in a plant under pressure, in particular in steam-generating or nuclear stations, so as to permit movements of rather low speed between said structures, for example under the effect of movements pertaining to thermal expansions, but prevent the movements from reaching an excessively high speed by an appreciable absorption of energy.

In particular, the device according to the invention is adapted to be employed for avoiding or limiting the whipping of a plant structure under pressure, such as for example a large-diameter pipe, relative to a fixed structure, such as a building or a reactor body in the event of a sudden fracture of the pipe. Indeed, in nuclear stations, steam at very high pressure is made to circulate in large-diameter piping leading from a steam generator and it will be understood that, in the event of fracture of such piping, the pressure exerts on the broken pipe a reaction force which, in respect of very high pressures, may reach several hundreds of tons, which results in a sudden whipping of the pipe under the effect of intense accelerations. In the case where the steam generator has a relatively large reserve supply of fluid under pressure, the whipping effect is maintained and, owing to the large masses of these pipes, and the intense accelerations, there may occur a destruction of the plant and of its control means which may have dangerous consequences, especially in the case of nuclear reactors.

Devices for damping or limiting movement are known which are adapted to be employed in nuclear stations for connecting structures, such as pipes or ducts, to fixed structures. They must in all cases allow displacements of large amplitude owing to variations in temperature.

As concerns the mechanical devices employed, they may be of two types:

In the first type, above a threshold characteristic acceleration or speed, the device becomes completely locked and remains locked so long as a force is continued to be applied.

These devices are perfectly suitable for protecting piping or equipment in the event of fracture, but there is a risk of their being locked in the event of sudden movements of the piping or of the equipment to be protected (sudden variation of pressure when actuating a valve, earth tremors, for example). These devices then remain locked as long as the force is applied and this may result in destruction of the equipment or of the device itself if a temperature variation causes displacement in the same direction as the locking direction. Consequently, they can only be employed in cases where it is certain that the equipment does not undergo sudden displacements in normal or disturbed operation.

In the second type, above a threshold characteristic acceleration or speed, the device brakes or retards the movement without completely locking it; so long as a force is applied there is a displacement. In this way it is certain that, in the event of an accidental locking, the system will unlock itself.

However, the braking force in the mechanical devices is usually a function of the acceleration and this limits the use of this equipment in the case of alternating forces, for example in the case of earthquakes or forces of very short duration, since, under the effect of continuous forces, they rapidly assume high speed and no longer perform their function.

However, some mechanical equipments exert a braking force which is a function of the speed, but they must then be dimensioned for absorbing energy. Hydraulic devices also operate on this principle, but there is the drawback of a risk of leakage and, moreover, they must also be dimensioned in order to avoid excessive elasticity owing to the compressibility of the fuild. Now, in the case of fracture of large-diameter or high-pressure piping, the forces involved are enormous and the dimensions of the equipment described hereinbefore would become very considerable.

The device according to invention provides a solution to these problems:

(1) It does not become completely locked.
(2) It can brake as a function of the speed.

A large number of types of energy-absorbing devices, such as hydraulic or mechanical dampers, are moreover known which permit the braking of a relative movement between two structures. For example, U.S. Pat. No. 2,856,179 of Oct. 14, 1958 discloses a shock-absorber for the landing undercarriage of an aircraft in which the movement of translation of one of the structure, namely the wheel, relative to the fixed structure, namely the strut of the undercarriage, is converted into a movement of rotation of a rotary member having a centrifugal friction means which have an effectiveness which increases with the speed of rotation and which brake the movement, it being arranged in some cases to associate this braking with a progressive damping, for example by means of a hydraulic or elastic damper. However, such devices are incapable of absorbing forces which are as intense as those which may occur in the event of fracture of pipes under very high pressure in plants under pressure. In the case where the amplitude of the movement, nothwithstanding the braking, is such that one of the moving elements abuts against the other at the end of travel, there is a risk of breakage of the device which would therefore at best only limit damage without preventing it. On the other hand, in the case where there is already provided a damper producing a progressive damping action as the movement continues, the damper would only have little effect if it is not powerful and if, on the contrary, it is powerful, it will tend to limit the speed of rotation of the rotary braking member whose effectiveness would then be reduced.

An object of the present invention is to overcome these drawbacks and to provide a device for limiting movements in plants under pressure, such as in particular pipes under high pressure in steam-generating or nuclear stations, which permits effectively limiting or controlling the whipping in the case of very large-diameter tubes or pipes under very high pressure developing enormous forces.

Another object of the invention is to provide such a device which never becomes completely locked.

Another object of the invention is to provide such a device which is capable of braking as a function of this speed.

Another object of the invention is to provide such a device which has a limited overall size while it permits a very considerable absorption of energy.

Its dimensions remain reasonable, since its object is to limit the speed of displacement to acceptable values so that the kinetic energy developed by the moving parts can be absorbed without harming the plant.

Another object of the invention is to provide such a device in which the kinetic energy is absorbed when the device reaches the end of its travel.

Another object of the invention is to provide a device which, even in the case of the maintenance of the force throughout the effective travel, is capable of mechanically resisting the destruction when its parts reach the end of travel.

A further object of the invention is to provide such a device which is particularly simple in design and is capable of operating during very long periods, without maintenance and in extremely difficult environments.

Another object of the invention is to provide such a device which is relatively cheap and cheap to run.

The invention provides a device for limiting movements, in particular for use against the whipping of large-diameter pipes under very high pressure in the event of sudden fracture, the device comprising a first element which is connected to one of the structures and is capable of moving in translation relative to a second element connected to the other structure, means for converting said movement of translation into a movement of rotation at high speed of a rotary element cooperating with the braking means having an effectiveness which increases with the speed of rotation, wherein powerful damping means are interposed between said two elements so as to be actuated toward the end of the total travel of one element relative to the other, said damping means being inoperative during the major part of the travel.

Thus, if a large acceleration occurs upon fracture of piping, the device according to invention then exerts a braking force which is sufficient to limit the speed of displacement to such value that, bearing in mind the masses in motion, it is possible to stop said masses at the end of travel without exceeding forces which would result in breakage of the connections. Therefore, there is a relationship between the maximum speed allowed by the device for the maximum applied force and the braking exerted at the end of travel, the masses of the moving parts and the maximum force acceptable for the connection.

According to a particularly improved feature of the invention, said damping means cooperate with said rotary member to produce a powerful braking of the rotary member at the end of travel.

Said damping means may comprise an extremely resilient damper capable of dissipating a large amount of energy during a short travel.

Thus said damping means may advantageously comprise, on an element which moves relative to the rotary member, a friction member which is normally held spaced away a short distance from an abutment rigid with the same element by means of a deformable element of great stiffness, such as, for example, a Belleville washer, so that, toward the end of the total travel, said sliding member comes in contact with the rotary member and rubs against the latter with a force which is increased by the progressive deformation of the deformable element so as to produce finally, during the remainder of the travel, a particularly intensive braking force on the rotary member so that there is achieved a simultaneous progressive stoppage of the movement of the two elements and of the rotation of the rotary member which then permits the device according to the invention, without having been destroyed by the impact at the end of travel, to continue to resist in the manner of an element, this time rigid, the continuation of the movement after having braked this movement by dissipating an extremely large amount of energy.

Preferably, the rotary member is formed by a member in the form of an internally screwthreaded nut through which extends a screwthreaded rod rigidly fixed to one of the elements, said rotary member being axially keyed relative to the other element so that the movement of translation of the rod produces the rotation of the rotary member. Particularly advantageously, the means for braking the rotary member may comprise friction members of the centrifugal type, for example segments capable of radially sliding in the rotary member into rubbing contact with a fixed peripheral cylindrical surface around the rotary member.

However, in another embodiment, the rotary member may cooperate with a fluid or a viscous material, such as a grease, interposed in a preferably narrow space between the rotary member and a fixed wall. Thus the rotary member may, for example, have a cylindrical outer surface spaced a short distance away from a cylindrical inner surface of the element relative to which it is axially keyed.

These embodiments permit constructing the device in a particularly compact tubular form and, according to a preferred embodiment of the invention, one of the elements has a tubular-shaped part which leads from means for connecting it to the other structure, this tubular-shaped part being slidable in the firstmentioned element and carrying, with an axial keying, said rotary member and braking means cooperating with said tubular part, the first element carrying in the centre thereof the screwthreaded rod extending through the screwthread of the rotary member and carrying, preferably at both ends, the damping means, such as a slidable friction member, which is spaced away from an abutment member, rigid with the rod, by a rather stiff elastic element, such as a Belleville washer.

The two elements of the device which are capable of moving in translation relative to each other are advantageously prevented from rotating. This may be achieved in the known manner by a conventional keying system. However, in a particularly preferred embodiment of the invention, this result may be advantageously obtained by the use of ball joints for mounting the two elements on their respective structures, these joints having, transverse to the axis about which develops the torque between the screwthreaded rod and the corresponding nut of the device, a large diameter so as to obtain a kind of wedging effect between the ball and its socket and, by means of the very large traction or compression forces exerted on the device, a friction which is large enough to withstand the torque and prevent rotation between the two elements of the device.

There is thus obtained in addition great simplification of the device with avoidance of machining and assembly operations.

Further features and advantages of the invention will be apparent from the ensuing description which is given merely by way of a non-limitative example with reference to the accompanying drawing in which FIG. 1 is a diagrammatic half-axial sectional view of the device according to the invention.

FIG. 2 is a diagrammatic sectional view taken on line II—II of FIG. 1.

FIG. 3 is an axial sectional view of a ball joint of the device.

FIG. 4 is a plan view of this ball joint.

With reference to the figures, there is shown a device according to the invention comprising an element 1 and an element 16. The element 1 has a portion of tubular shape 1 rigidly connected at one of its ends to an end wall 3 having a lug 4 with a transverse socket or seat 5 for connecting a ball joint, for example to a part 6 of a structure such as a large-diameter pipe or duct.

The wall 3 carries in its centre part a rigid screwthreaded rod 7 provided with an end extension 8 and an integral portion 9 connected to the wall 3, the rod parts 8 and 9 having at their ends remote from each other two abutment collars 10 and 11 respectively which are axially keyed on the rod 7 so that they are rigidly secured to the latter. Two rings 12, 13 are axially slidable on the rod 7 and are normally maintained spaced away from their respective abutment collars 10, 11 by respective Belleville washers 14, 15.

The other element 16 also has a tubular shaped portion 17 which extends into the tubular portion 2 and is guided in a slidable manner in the latter, for example by a portion 18 which has a larger outside diameter substantially corresponding to the inside diameter of the tubular portion 2. The element portion 17 is connected, at its end outside the element 1, to an end wall 19 with a ball joint socket 20 identical to the socket 5. The distance between the two sockets 5 and 20 is for example of the order of 1.675 mm, the outside diameter of the part 2 being 470 mm.

Mounted inside the tubular portion 17 of the element 16 and in the region of the portion 18 is a rotary member 21 in the form of a nut having an internal screwthreaded central passage through which extends the screwthreaded rod 7. The common helix angle of the screwthreads of the rod 1 and nut 21 is, for example, of the order of 5° to 20°.

Externally, the rotary member or nut 21 is shaped in such a manner as to have two planar radially extending faces 22, 23, and a periphery defined by two flanges 24, 25 respectively applied against two roller bearings 26, 27 which allow the rotation of the member 21 relative to the tubular portion 17 of the element 16 but prevent any relative axial movement. The bearing 26 is held in position against a shoulder 28 on tubular portion 17 and the bearing 27 is held in position by a collar 29 screwthreadedly engaged in the internally screwthreaded end portion of tubular portion 17.

Between the two flanges 24, 25, the rotary member 21 has an annular recess whose cylindrical bottom 30 is parallel to the inner cylindrical surface in the portion 18 of tubular portion 17, this recess being interrupted by three transverse radial extensions 31 which are rigid with the member 21 and connected to the flanges 24, 25 in the manner of the bars of a squirrel cage so as to divide the recess into three identical cavities which have a cylindrical bottom and are each occupied by a friction segment 32 having the general shape of a half of a circle. The thickness of each friction segment 32 is slightly less than the distance between the bottom of the cavity receiving the segment and the tubular portion 17.

The device operates in the following manner:

Starting in the position of rest shown in FIG. 1, when one of the structures, for example the structure 6 rigid with a large-diameter pipe, starts to move slowly relative to the other structure, the element 1 will move in translation relative to the element 16 which slides in the latter. The screwthreaded rod 7 rigid with the element 1 will therefore move axially relative to the rotary member 21 which is consequently driven in rotation. The speed of rotation remains relatively low so that the centrifugal force exerted by this rotation on the elements 32 is low and the movement can therefore continue substantially without a braking effect.

On the other hand, when the structure 6 is subjected to an intense acceleration force relative to the other structure, for example upon fracture of the pipe under high pressure, the pipe structure will move relative to the other structure under the whipping effect at a very rapidly increasing speed. Under these conditions, the rod 7 is rapidly moved in translation relative to the rotary member 21 and this will rotate the member 21 at a very high speed under the amplifying effect produced by the very small helix angle of their common screwthreads. The free segments 32 are then projected under centrifugal force against the wall of the tubular portion 17 where they create friction and produce an intense braking effect with a large dissipation of energy. Under this braking effect, the screwthreaded rod 7 will have its speed limited, for example to a value of 50 cm per second for a force of 500 metric tons, so that the whipping movement will be slowed down and held under control. If the pressure in the fractured tube drops rather rapidly, the movement will slow down. On the other hand, if this pressure is maintained at a high value for a relatively long period, the rotary member 21 will approach, in the direction of its movement, the friction ring 12 or the friction ring 13 by its corresponding face 22 or 23. Toward the end of travel, this face, for example the face 22, will come into contact with the friction ring 12, which is keyed to rotate with the part 8 of the rod 7, so that this ring will exert a friction force on the face of the rotary member 21 rotating at high speed. As the movement continues, the sliding ring 12 will gradually approach its abutment collar 10 by progressively deforming the elastic Belleville washer 14 which, as it deforms, urges the ring 12 toward the face 22 of the nut 21 with an increasing force so that the braking produced by the friction of the ring 12 against the rotary member 21 will increase.

By means of a judicious choice of the dimensions and stiffness of the Belleville washers, it is possible to achieve stoppage with zero speed of rotation after having dissipated a large part of the energy at the end of travel, with no risk of breakage of the device under the effect of end-of-travel impacts.

It will be understood that many modifications may be made in the invention as illustrated. Thus, instead of employing centrifugal segments 32 for the braking means, the latter may be arranged in some other way. In particular, the member 21 may be arranged to be substantially cylindrical on its periphery by interposing a viscous grease between this periphery and tubular portion 17 so as to produce a braking effect which increases rapidly with the speed. Other braking means may be employed. However, simple arrangements are preferred and in particular that shown in the drawing, since it is fully reliable and requires no maintenance.

FIGS. 3 and 4 show a modification of the device in which ball joints are employed for preventing rotation of the element 1 relative to the element 6 instead of a key device (not shown in the drawing). The lugs 4 and 19 of the elements 1, 16 are then replaced, for example, by an axial rod 33 whose free end carries a substantially spherical ball 34. The ball socket or seat rigid with a structure, for example piping, comprises two semi-sockets 35, 36 one of which carries a base 37 having orifices 38 for fixing the base to the structure. The annular bearing surfaces 39, 40 of the semi-sockets are disposed on each side of the transverse plane of the rod 33 so that the ball 34 bears against its socket in the vicinity of its surface transversely spaced away from the geometric axis of the elements 1, 16. It can be seen that the semi-sockets 39, 40 thus form one of annular zones which have a small inclination relative to this axis. Consequently, when the device is made to operate, there is produced, by a wedging effect, a very intense frictional force between the ball and its socket at the end of the device, so that the torque which tends to turn the element 1 relative to the element 16 is resisted by the two ball joints and the two elements remain angularly relatively immobile.

Having now described our invention what we claim as new and desire to secure by Letters Patent is:

1. In a movement limiting device for limiting relative movement between two structures and in particular for opposing the whipping of a large-diameter pipe under very high pressure in the event of sudden fracture, said device comprising a first element for connection to one of the structures, a second element coaxial with the first element for connection to the other structure and axially movable in translation relative to the first element, a rotary member, means for converting said movement of translation into a movement of rotation of the rotary member at high speed, braking means cooperative with the rotary member for braking the rotary member and having an effectiveness which increases with the speed of rotation of the rotary member; the improvement comprising powerful damping means interposed between said two elements, and means for bringing into action the damping means close to the end of total travel of the first element relative to the second element and rendering the damping means inoperative during the major part of said total travel.

2. A device according to claim 1, wherein the damping means are cooperative with said rotary member so as to produce a powerful braking of the rotary member close to the end of said total travel.

3. A device according to claim 2, wherein said first element is axially movable relative to the rotary member and carries abutment means rigid with said first element, slidable friction means, and very stiff deformable means interposed between the friction means and the abutment means for normally maintaining the friction means spaced a short distance away from the abutment means, so that, close to the end of said total travel, said rotary member comes into contact with said slidable friction means and rubs against said slidable friction means with a force which increases with the progressive deformation of the deformable means.

4. A device according to claim 1, wherein said rotary member is constituted by an internally screwthreaded nut, through which nut extends a correspondingly screwthreaded rod which is screwthreadedly engaged with said nut and rigid with said first element, means being provided to maintain said nut in position axially of said second element.

5. A device according to any one of the claims 1 to 4, wherein said braking means comprise friction segments operative by the action of centrifugal force and slidable radially of the rotary member, and means defining a fixed peripheral cylindrical surface around the rotary member with which surface the segments are engageable.

6. A device according to any one of the claims 1 to 4, wherein said braking means comprise a fixed wall defining a narrow space with said rotary member, and a viscous material in said narrow space.

7. A device according to any one of the claims 1 to 4, wherein each element comprises a tubular portion, one tubular portion being axially slidable in the other tubular part.

8. A device according to any one of the claims 1 to 4, comprising ball joints for respectively connecting the elements to their structures, each ball joint comprising a ball and means defining a ball socket having surfaces which are transversely remote from said axis of said two elements and are slightly inclined relative to said axis so as to resist, upon operation of the device, by an effect of friction between the ball and said socket surfaces, torque which tends to turn one of said elements relative to the other of said elements.

* * * * *